United States Patent [19]

Meksula

[11] 3,713,529
[45] Jan. 30, 1973

[54] PORTABLE CONTAINER FOR FISHING TACKLE AND THE LIKE

[76] Inventor: Bernard Meksula, 13215 Maplerow Ave., Garfield Heights, Ohio 44105

[22] Filed: Feb. 24, 1971

[21] Appl. No.: 118,439

[52] U.S. Cl. ............... 206/16 R, 190/11, 312/272
[51] Int. Cl. ............... A45c 11/00, B65d 85/54
[58] Field of Search ....... 206/16 R, 16 E, 12; 190/11, 190/30; 43/57.5 R; 312/294, 272, 312

[56] References Cited

UNITED STATES PATENTS

| | | | |
|---|---|---|---|
| 2,936,066 | 5/1960 | Meksula | 206/16 R |
| 2,055,657 | 9/1936 | Gordon | 206/12 |
| 3,113,817 | 12/1963 | Imel | 206/12 |
| 891,103 | 6/1908 | Schaney | 43/57.5 R |
| 2,370,941 | 3/1945 | Dawson | 206/12 |
| 1,445,566 | 2/1913 | Stoll | 190/11 |

Primary Examiner—William T. Dixson, Jr.
Attorney—Isler and Ornstein

[57] ABSTRACT

A portable container for fishing tackle and the like is described, in which tiers of trays are provided, with the uppermost tray in each tier having a lid, these uppermost trays being so arranged and hinged to other trays as to be movable into contiguity with each other, whereby the lids conjointly provide a table of substantial size for various purposes. The arrangement, moreover, is such as to permit the contents of more than one tray in each tier to be simultaneously examined by a fisherman, to thereby facilitate and extend his range of selection of baits, etc. The lids may also be made of a transparent plastic, to thereby enable the contents of the trays covered by said lids to be examined without opening the lids.

5 Claims, 12 Drawing Figures

INVENTOR.
BERNARD MEKSULA

BY

*Isler & Ornstein*

ATTORNEYS

INVENTOR.
BERNARD MEKSULA
BY
Osler & Ornstein
ATTORNEYS

PATENTED JAN 30 1973 3,713,529
SHEET 4 OF 5
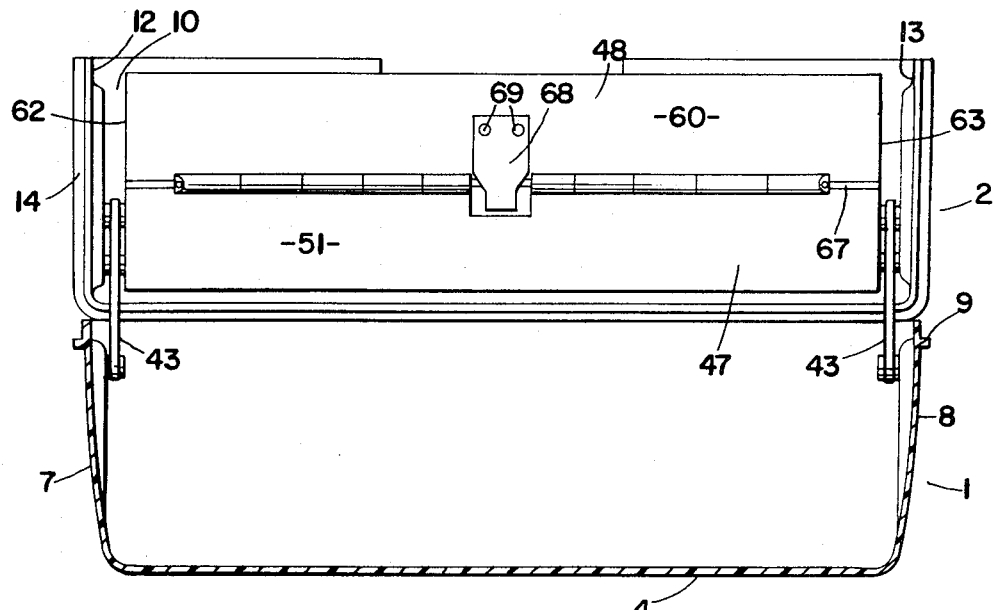
Fig. 7
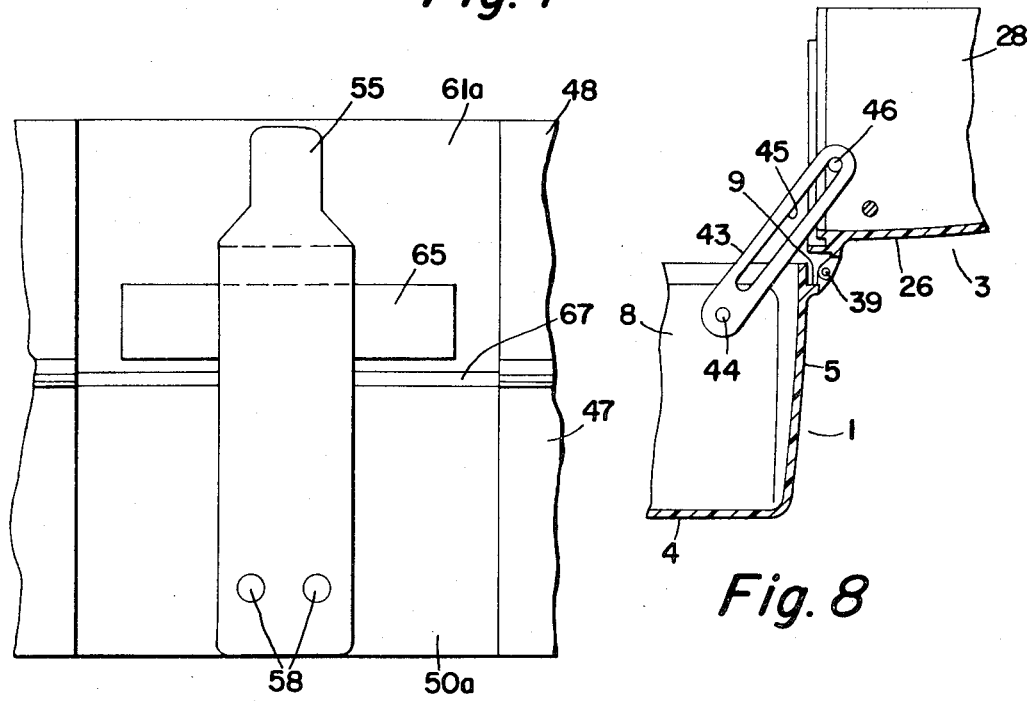
Fig. 9
Fig. 8
INVENTOR.
BERNARD MEKSULA
BY
Isler & Ornstein
ATTORNEYS

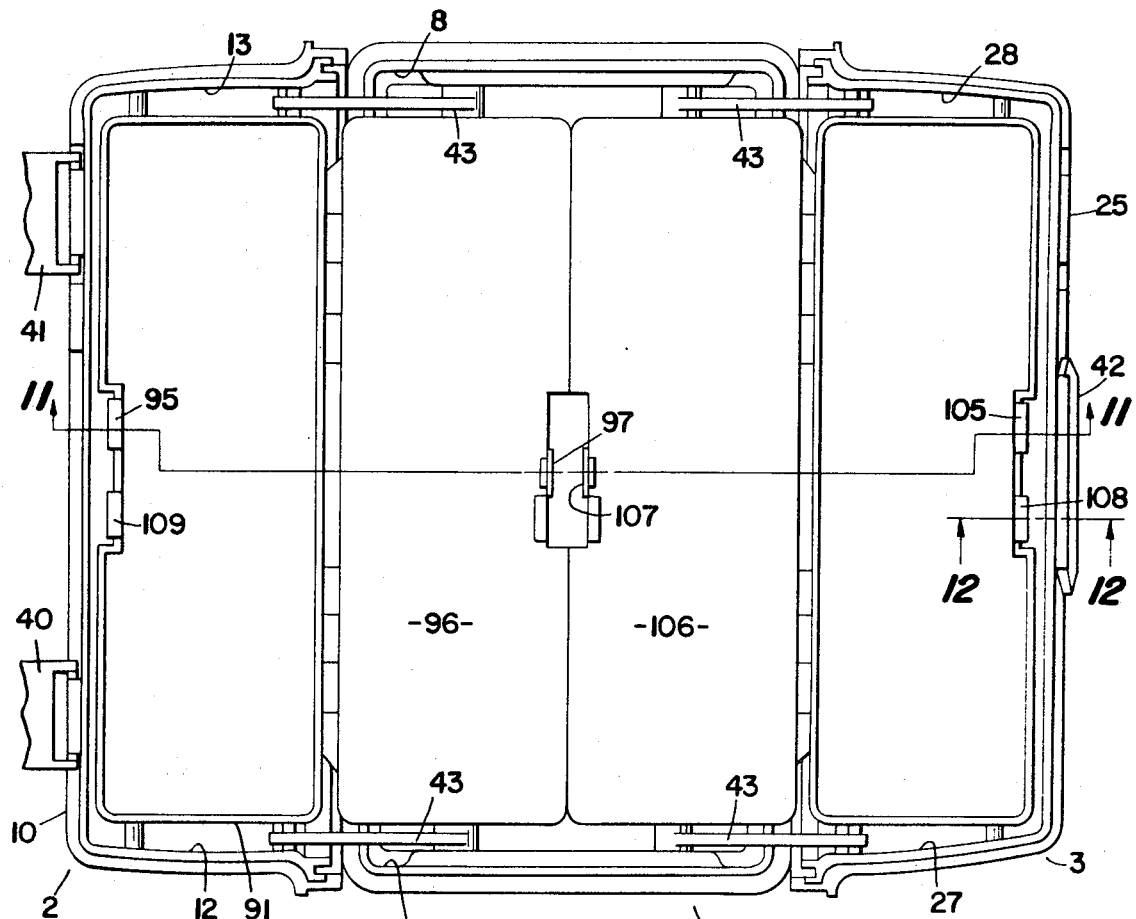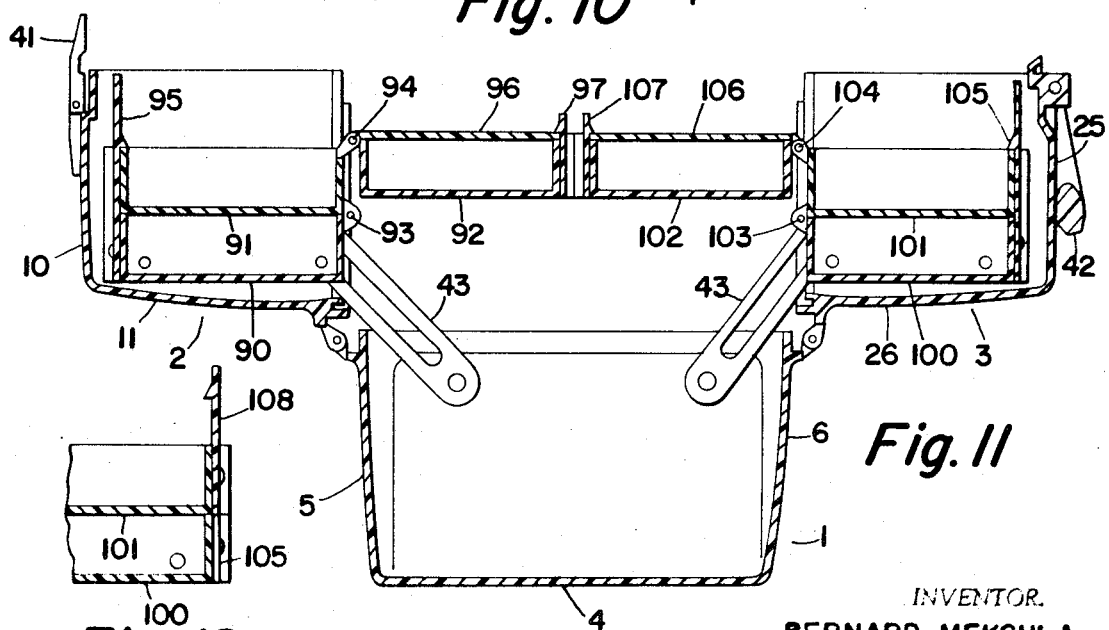

PORTABLE CONTAINER FOR FISHING TACKLE AND THE LIKE

In my U.S. Pat. No. 2,936,066, a portable container for fishing tackle and other purposes is disclosed, having a body of rectangular box-like form comprising a bottom, sides and ends. A rectangular cover is hingedly secured to the upper edge of each of said sides, each cover comprising a side wall, a top and ends, said covers movable to a closed position in which the covers meet along a plane substantially perpendicular to said bottom, and to an open position in which the side walls of the covers extend substantially parallel with said bottom.

The container of said patent is further characterized by the fact that there is disposed within each cover a tier of trays, as well as a lid for closing the uppermost tray in each tier. Each tray has a bottom, sides and ends, with one side of each tray being hingedly secured to the corresponding side of the tray underneath, and each lid is hingedly secured to the uppermost tray at the same side that each tray is hingedly secured to the tray therebeneath.

Locking means are provided for permitting access to any desired tray, and when access to the trays is desired, one or both of the covers is disposed in a horizontal or open position, the covers being supported in such position by means of a leg or strut pivotally secured to each of the covers externally of the covers, and which is movable to a vertical position.

It is desirable, at times, to utilize the lids of the container conjointly in such a manner as to provide a small, yet ample size, table or support for the purpose of playing cards, as a lunch table, or for preparing baits and other fishing tackle, but due to the fact that the lids of the container of the aforesaid patent are not coplanar, when the covers are in open position, as well as the fact that even if the lids were coplanar, they would, if opened, overlap each other and thus provide a surface no larger than that provided by a single lid, the container of that patent would not be very satisfactory for such purposes.

It is also desirable, at times, for the fisherman, to be able to simultaneously inspect the bait or other contents of more than one tray of each tier of trays, but this is virtually impossible to do with the container of the aforesaid patent.

The present invention has, as its primary object, the provision of a portable container of the character described, having lids which can be arranged or disposed conjointly or in edge-to-edge relation to provide a table of substantial size or area for the purpose of playing cards thereon, for utilizing the table as a lunch or food table, for preparing baits and other fishing tackle, and for numerous other purposes.

Another object of the invention is to provide a portable container of the character described, in which the contents of more than one tray in each tier of trays can be simultaneously examined by the fisherman to thereby facilitate and extend his range of selection.

A further object of the invention is to provide a container of the character described, in which the lids are made of a transparent plastic or like material, whereby the lids not only serve the purposes referred to above, but also enable the contents of the trays covered by said lids to be examined or viewed, without opening the lids.

A still further object of the invention is to provide a container of the character described, in which the covers are maintained in their open positions by means which are not external to the container.

Other objects and advantages of my invention will be apparent during the course of the following description.

In the accompanying drawings forming a part of this specification, and in which like numerals are employed to designate like parts throughout the same, FIG. 1 is a side elevational view of a preferred form of container, in closed condition;

FiG. 7 is a cross-sectional view, taken on line 7—7 of FIG. 4;

FIG. 8 is a fragmentary cross-sectional view, taken on the line 8—8 of FIG. 4;

FIG. 9 is a fragmentary cross-sectional view, taken on the line 9—9 of FIG. 4;

FIG. 10 is a view similar to FIG. 5, but showing a modification of the invention;

FIG. 11 is a cross-sectional view, taken on the line 11—11 of FIG. 10, and

FIG. 12 is a fragmentary cross-sectional view, taken on the line 12—12 of FIG. 10.

Figure 1:
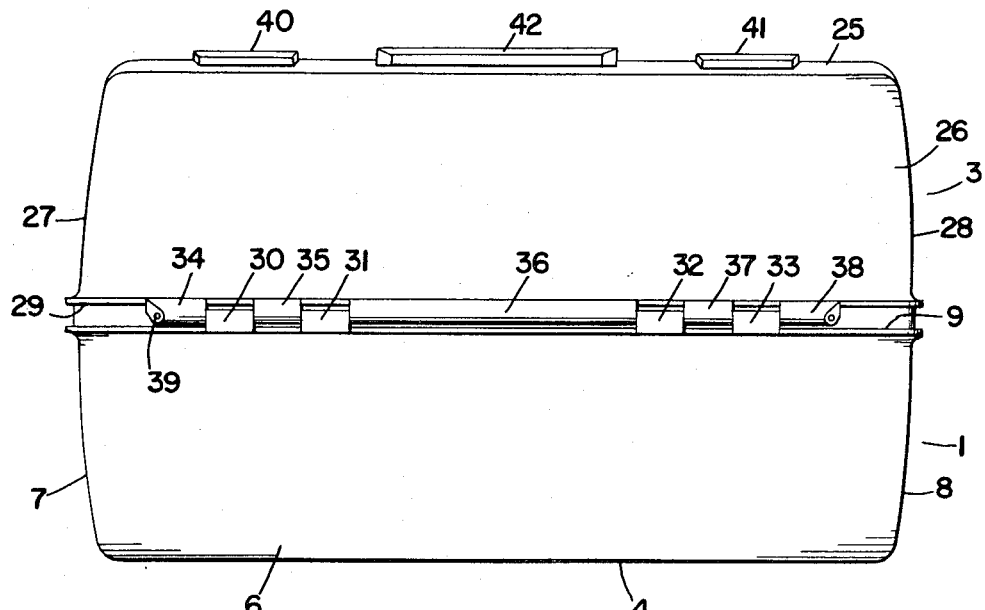

Referring more particularly to FIGS. 1 to 9 inclusive of the drawings, the fishing tackle box will be seen to comprise a body or lower portion, generally designated by reference numeral 1, and cover or lid portions, generally designated by reference characters 2 and 3 respectively.

The body 1 is of rectangular box-like form, molded or formed of plastic or other material, and comprises a bottom 4, sides 5 and 6, and ends 7 and 8. The body portion 1 is also provided with a horizontal flange or shoulder 9 which extends completely around the body 1.

The cover 2, which is also molded or formed of the same plastic or material as the body 1, comprises a top 10, a side wall 11, ends 12 and 13, and a flange 14, which extends around the side wall 11 and ends 12 and 13.

For the purpose of pivotally connecting or hinging the cover or lid portion 2 to the body or lower portion 1 of the box, the flange or shoulder 9 of the latter has formed integrally therewith upstanding spaced hinge plates 15, 16, 17 and 18 (see FIG. 2), and the flange 14 of the cover 2 is provided with depending hinge plate portions 19, 20, 21, 22 and 23, and a hinge pin 24 is provided (see FIG. 3) which extends through all of the hinge plates 15 to 23 inclusive.

The cover 3, which is also molded or formed of the same plastic or material as the body 1 and cover 2, comprises a top 25, a side wall 26, ends 27 and 28, and a flange 29 which extends around the side wall 26 and ends 27 and 28.

For the purpose of pivotally connecting or hinging the cover or lid portion 3 to the body or lower portion 1 of the box, the flange or shoulder 9 of the latter has formed integrally therewith upstanding hinge plates 30, 31, 32 and 33 (see FIG. 2), and the flange 29 of the cover 3 is provided with depending hinge plate portions 34, 35, 36, 37 and 38, and a hinge pin 39 is provided (see FIG. 3) which extends through all of the hinge plates 30 to 38 inclusive.

Figure 2:
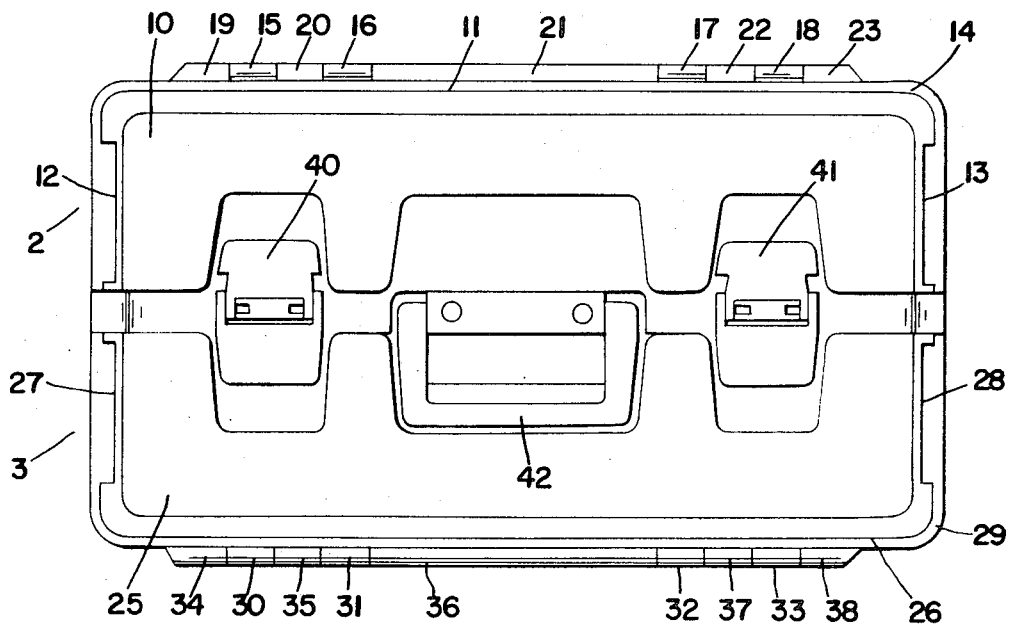
FIG. 2 is a top plan view of the container of FIG. 1.
Figure 3:
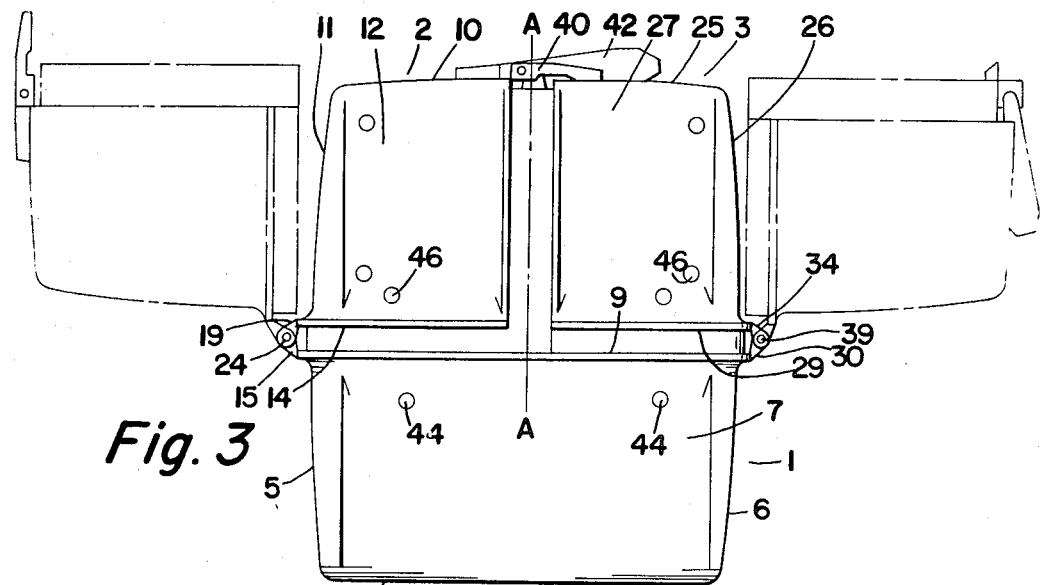
FIG. 3 is an end elevational view of the container of FIG. 1, as viewed from the left of FIG. 1, and showing, in broken lines, the covers of the container in their open position.

When the covers 2 and 3 are in closed position, as shown in FIGS. 1, 2 and 3, they rest on the flange or shoulder 9 of the body 1, and in this position, it is to be noted, that they meet substantially along a plane A—A (FIG. 3) which is not only substantially perpendicular to the bottom 4 of the body 1, but also lies substantially along the longitudinal center line of the bottom 4. Since the covers 2 and 3 are of substantially the same dimensions, the volumetric space within each of the covers is substantially the same, so that each cover provides substantially the same amount of space for a tier of trays to be presently described as the other cover provides. This, plus the fact that each of the covers, when in closed position, has a width, transversely of the body 1, of about one-half the transverse width of the body 1, makes possible certain features of the invention to be presently described.

With the covers 2 and 3 in closed position, they may be latched or locked to each other by means of toggle clamps or locks, generally indicated by reference numerals 40 and 41. The details of such clamps or locks form no part of the present invention, and need not, therefore, be further described, although the construction and operation of such clamps can be understood be reference to my U.S. Pat. No. 3,606,005, issued Sept. 20, 1971, for Fishing Tackle Box.

With the covers in closed and locked position, the box may be carried by means of a handle 42, which is pivotally connected to the cover 3 of the box.

Figure 4:
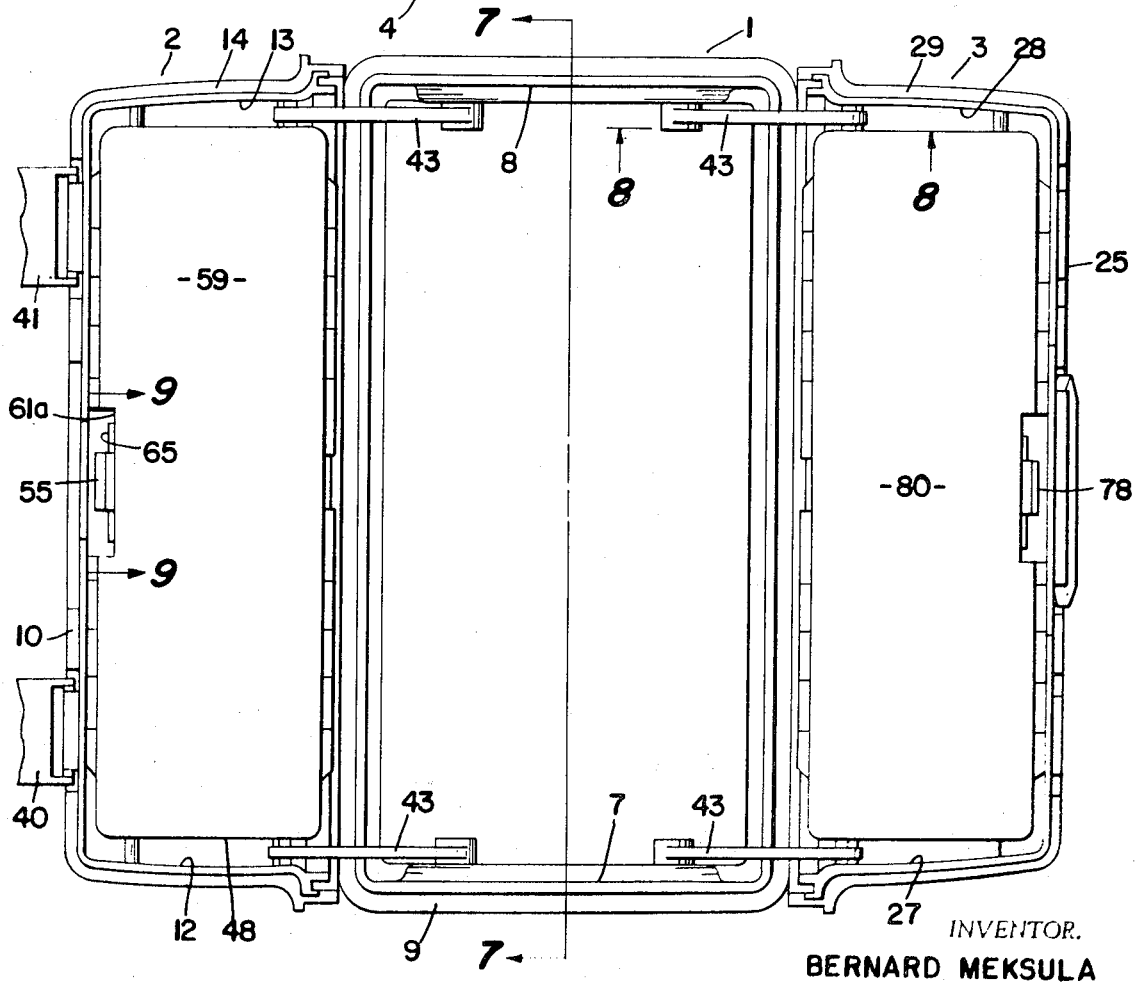
FIG. 4 is a top plan view of the container of FIG. 3, with the covers in open position.

When the covers 2 and 3 are in fully open position, as shown in FIG. 4, they are retained in such position by means of connector bars or links 43, which are pivotally connected to pivot pins 44 which are secured to the ends 7 and 8 of the body 1. These bars or links are provided with slots 45 through which extend pins 46, which are riveted to the ends of the covers 2 and 3. With the covers in fully open position, the pins 46 engage the outer ends of the slots 45 to thus limit further outward movement of the covers, and when the covers are moved to closed position, the pins 46 move along the slots.

With the covers 2 and 3 in fully open position, the side walls 11 and 26 are not only substantially coplanar but also lie in planes substantially parallel with the plane of the bottom 4 of the body 1.

Disposed within the cover 2 is a tier of trays 47 and 48, the tray 48 being superimposed on the tray 47.

The tray 47 consists of a bottom 49, sides 50 and 51, and ends 52 and 53, the tray being supported adjacent the side wall 11 of the cover by means of rivets 54 which extend through the ends 12 and 13 of the cover and into the ends 52 and 53 of the tray.

The side 50 of the tray has an inwardly offset portion 50a which provides a recess 54a for an upstanding latch plate 55, of plastic material, which is riveted to the portion 50a by means of rivets 58, and serves a purpose to be presently described.

Figure 6:
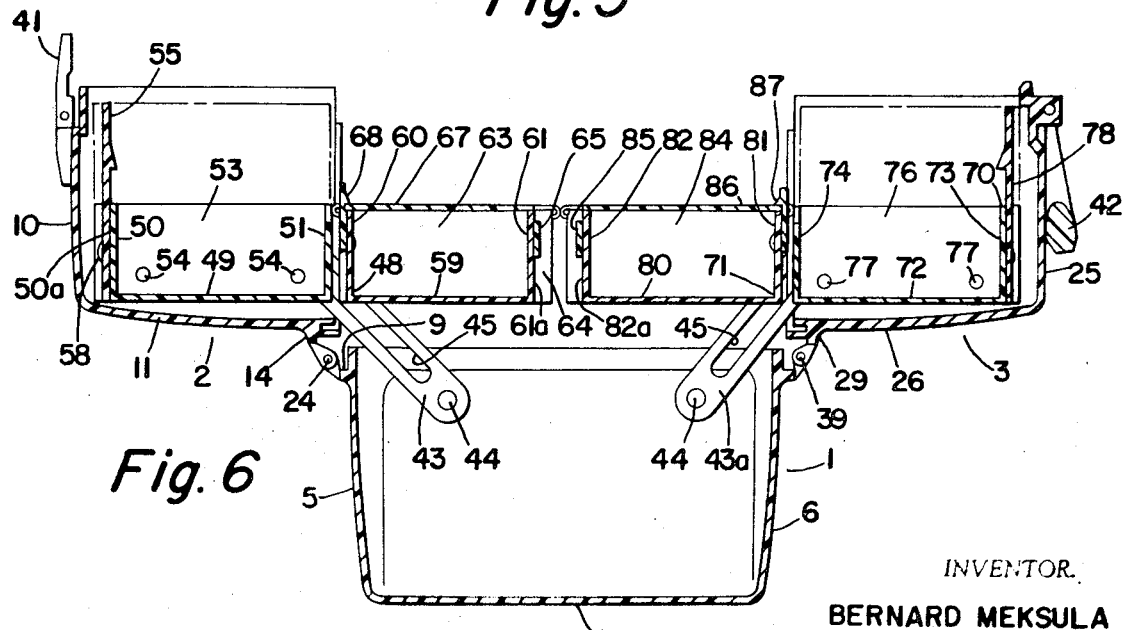
FIG. 6 is a cross-sectional view, taken on the line 6—6 of FIG. 5.

The tray 48 is in inverted relation to the tray 47, and comprises a bottom 59, sides 60 and 61 and ends 62 and 63. The side 60 is hinged (see FIG. 7) at its lower edge to the upper edge of the side 51 of the tray 47, so that the tray 48 may be rotated about the hinge to a position as shown in FIG. 6, parallel with the bottom 4 of the body 1 and alongside the tray 47. The side 61 has an inwardly offset portion 61ia which provides a recess 64 for a keeper plate 65, of plastic material, which is riveted to the portion 61a.

When the tray 48 is superimposed on the tray 47, the latch plate 55 engages the keeper plate 65 to thereby maintain the tray 48 latched to the tray 47. However, since the tray 48 is in inverted relation to the tray 47, it is necessary to provide means to prevent the contents of the tray 48 from falling out. For this purpose, a lid 67 is provided, which is hinged (see FIGS. 5 and 6) to the lower edge of the side 61 of the tray 48, to that when the tray 48 overlies the tray 47, the lid 67 is disposed between the trays 47 and 48, to prevent the contents of the tray 48 from falling out.

A latch plate 68 (FIGS. 5 and 7) is secured to the side 60 of the tray 48 by means of rivets 69, and serves as a means of resiliently latching the lid 67 to the tray 48.

Disposed within the cover 3 is a tier of trays 70 and 71, the tray 71 being superimposed on the tray 70.

The tray 70 consists of a bottom 72, sides 73 and 74, and ends 75 and 76, the tray being supported adjacent the side wall 26 of the cover 3 by means of rivets 77 which extend through the ends 27 and 28 of the cover and into the ends 75 and 76 of the tray.

The side 73 of the tray has an inwardly offset portion 73a, which provides a recess for an upstanding latch plate 78, of plastic material, which is riveted to the position 73a by means of rivets, and serves a purpose to be presently described.

The tray 71 is in inverted relation to the tray 70, and comprises a bottom 80, sides 81 and 82 and ends 83 and 84. The side 81 is hinged at its lower edge to the upper edge of the side 74 of the tray 70, so that the tray 71 may be rotated about the hinge to a position as shown in FIG. 6, parallel with the bottom 4 of the body 1, and alongside the tray 70. The side 82 has an inwardly offset portion 82a which provides a recess for a keeper plate 85 of plastic material which is riveted to the position 82a.

When the tray 71 is superimposed on the tray 70, the latch plate 78 engages the keeper plate 85 to thereby maintain the tray 71 latched to the tray 70. However, since the tray 71 is in inverted relation to the tray 70, it is necessary to provide means to prevent the contents of the tray from falling out. For this purpose, a lid 86 is provided, which is hinged to the lower edge of the side 82 of the tray 71, so that when the tray 71 overlies the tray 70, the lid 86 is disposed between the trays 70 and 71, to prevent the contents of the tray 71 from falling out.

A latch plate 87 is secured to the side 81 of the tray 71 by means of rivets, and serves as a means of resiliently latching the lid 86 to the tray 71.

Figure 5:
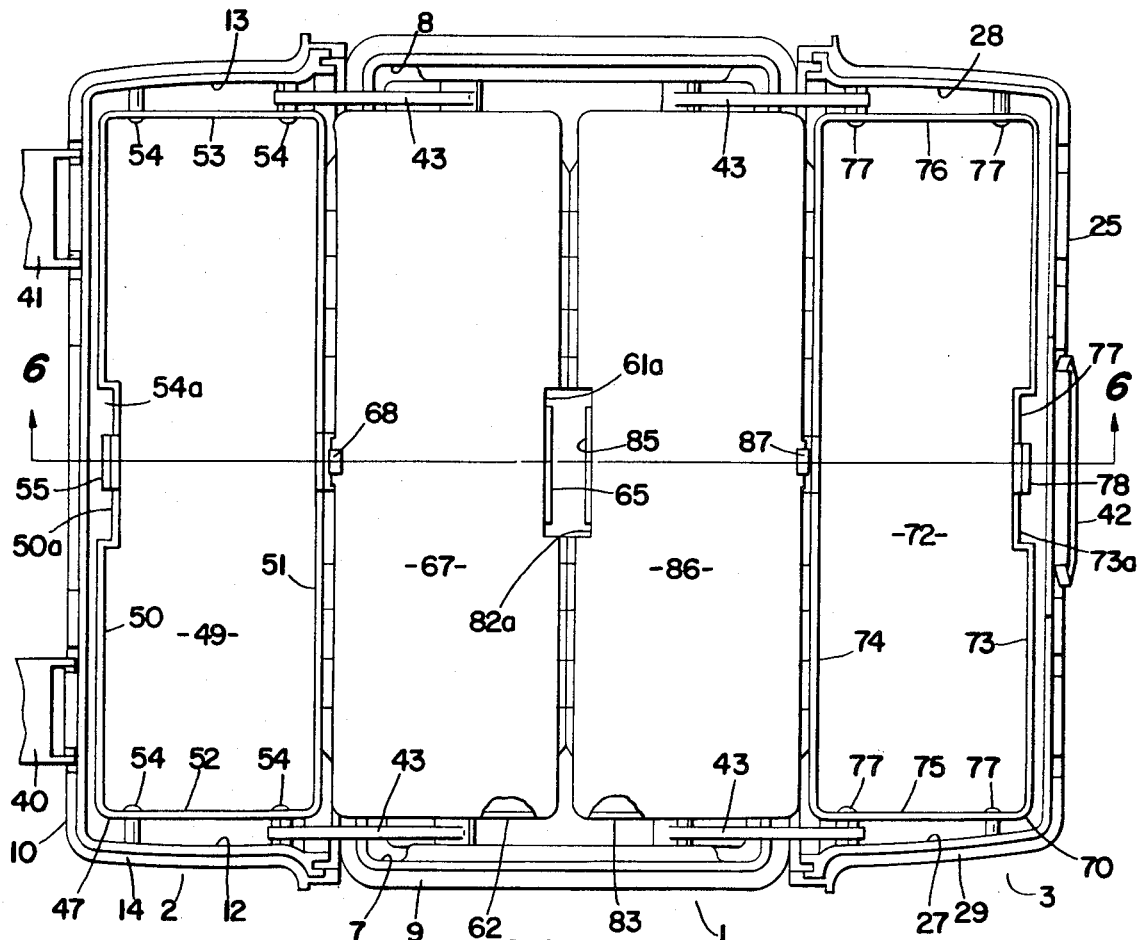
FIG. 5 is a view similar to FIG. 4, but with the upper trays in each tier of trays moved to positions alongside the trays therebeneath.

When the covers 2 and 3 are in open position, as shown in FIGS. 4, 5 and 6, the trays 48 and 71 may be moved about their hinges to a position, as shown in FIGS. 5 and 6, in which the lids 67 and 86 are not only coplanar, but lie in substantially edge to edge contiguity with each other. This is made possible by the fact that each of the covers, has a width transversely of the body of about one-half of the transverse width of the body, and by the fact that the lids 67 and 86 similarly have a width of about one-half of the transverse width of the body.

This coplanarity and contiguity of the lids provides a substantially rectangular table of substantial size or area, upon which cards may be played, or food served, or baits and other fishing tackle prepared for use.

This arrangement also permits the lids to be lifted, so as to expose for inspection by the fisherman, the contents of the trays 48 and 71 at the same time that the contents of the trays 47 and 70 are being examined or inspected.

If desired, the lids may be made of a transparent plastic, in which case, it is not even necessary to lift the lids 67 and 86 for the purpose of inspecting the contents of the underlying trays.

Moreover, through the use of the connector bars or links 43, the covers 2 and 3 are retained in fully open position, without the use of the exposed legs or struts of the box of my aforesaid patent.

It is to be further noted that when the box is closed, the trays do not extend into the body 1 of the box, so that all of this body portion of the box is left free for carrying various articles, other than tackle, which are normally carried by fishermen, such as a Thermos bottle, certain articles of clothing, etc.

In FIGS. 10, 11 and 12, a modification is shown, in which the container is generally similar in construction to that of the container of FIGS. 1 to 9.

In this case, however, there is disposed within the cover 2 a tier of trays 90, 91 and 92. The trays 90 and 91 are open at the top, and the tray 91 is superimposed on the tray 90, and is hingedly secured to the latter at 93. The tray 90 is rigidly supported within the cover 2 in the same manner that the tray 47 is supported in the previously described form of the invention.

The tray 92 is in inverted relation to the tray 91, and is hinged to the latter as at 94.

A latch plate 95 is secured to the tray 90 and is used to resiliently latch the tray 91 to the tray 90, when the tray 91 is in superimposed relation to the tray 90. A lid 96 is provided for the tray 92 to prevent the contents of the tray 92 from falling out when the tray 92 is superimposed on the tray 91. The lid 96 is also hinged to the tray 91 as at 94. In other words, the hinge for the lid 96 is at the opposite side of the tray that the lid 67 (FIG. 6) is in relation to the tray 48, so that the lid 96 is rotated about its hinge in a counter-clockwise direction (as viewed in FIG. 11) to open the lid.

The lid 96 is latched to the tray 92 by means of a resilient latch plate 97.

There is disposed within the cover 3 a tier of trays 100, 101 and 102. The trays 100 and 101 are open at the top, and the tray 101 is superimposed on the tray 100 and is hingedly secured to the latter at 103. The tray 100 is rigidly supported within the cover 2 in the same manner that the tray 70 is supported in the previously described form of the invention.

The tray 102 is in inverted relation to the tray 101 and is hinged to the latter as at 104.

A latch plate 105 is secured to the tray 100 and is used to resiliently latch the tray 101 to the tray 100, when the tray 101 is in superposed relation to the tray 100. A lid 106 is provided for the tray 102, to prevent the contents of the tray 102 from falling out when the tray 102 is superimposed on the tray 101. The lid 106 is also hinged to the tray 101 as at 104. The hinge for the lid 106 is thus at the opposite side of the tray that the lid 86 (FIG. 6) is in relation to the tray 71, so that the lid 106 is rotated about its hinge in a clockwise direction (as viewed in FIG. 11) to open the lid.

The lid 106 is latched to the tray 102 by means of a resilient latch plate 107, similar to the latch plate 97.

For the purpose of latching the tray 102 to the tray 101, a latch plate 108 (see FIGS. 10 and 12) is provided, which is secured to the tray 101, and for the purpose of latching the tray 92 to the tray 91, a similar latch plate 109 (see FIG. 10) is provided, which is secured to the tray 91.

When the covers 2 and 3 are in open position, as shown in FIGS. 10 and 11, the trays 92 and 102 may be moved about their hinges to the position shown in these figures, in which the lids 96 and 106 are not only coplanar, but lie in edge-to-edge contiguity with each other.

In this manner, all of the advantages previously described with reference to FIGS. 1 to 9 are also found in the modified form of invention.

A feature of the present box is the fact that if the box, in open condition, is overturned, none of the trays will open, so that the box, in effect, is spillproof, and the contents of the trays will not fall out.

It is to be understood that the forms of my invention, herewith shown and described, are to be taken as preferred examples of the same, and that various changes may be made in the shape, size and arrangement of parts thereof, without departing from the spirit of the invention or the scope of the subjoined claims.

Having thus described my invention, I claim:

1. In a portable container of the character described, a body of substantially rectangular box-like form comprising a bottom, sides and ends, a cover hingedly secured to the upper edge of each of said sides, each cover comprising a side wall, a top and ends, said covers movable to a closed position in which the covers meet along a plane substantially perpendicular to said bottom and which plane substantially intersects the longitudinal center line of said bottom, and to an open position in which the sides of the covers lie in planes substantially parallel with said bottom, said covers, when in open position, being of substantially the same depth, a tier of trays mounted in each cover, with the uppermost tray in each tier being hingedly connected to the tray immediately therebeneath, whereby said uppermost trays are movable to a position alongside the tray immediately therebeneath, and, when the covers are in open position, substantially fill the space between the trays alongside which they lie.

2. A container, as defined in claim 1, wherein said uppermost trays are provided with lids which are hingedly secured to the uppermost trays, said lids conjointly providing a substantially flat continuous surface.

3. A container, as defined in claim 2, wherein said uppermost trays in each tier are in inverted relation to the trays immediately therebeneath, and said lids are effective to prevent the contents of said uppermost trays from falling into the trays immediately therebeneath.

4. A container, as defined in claim 3, including means for latching the uppermost trays to the trays immediately therebeneath.

5. A container, as defined in claim 4, including means for latching said lids to said uppermost trays.

* * * * *